United States Patent [19]

Hodemaekers

[11] 4,298,866
[45] Nov. 3, 1981

[54] LIQUID CRYSTAL DISPLAY DEVICE HAVING CAPACITANCE COMPENSATION

[75] Inventor: Andreas M. L. Hodemaekers, Eindhoven, Netherlands

[73] Assignee: U.S. Philips Corporation, New York, N.Y.

[21] Appl. No.: 91,429

[22] Filed: Nov. 5, 1979

[30] Foreign Application Priority Data

Dec. 15, 1978 [NL] Netherlands ..................... 7812214

[51] Int. Cl.³ .............................................. G06F 3/14
[52] U.S. Cl. .................................... 340/713; 340/784; 350/331 T
[58] Field of Search ............................ 340/713, 784; 350/331 R, 331 T, 332, 336

[56] References Cited

U.S. PATENT DOCUMENTS

| | | | |
|---|---|---|---|
| 3,410,999 | 11/1968 | Fergason et al. | 340/713 |
| 3,705,310 | 12/1972 | Wild | 350/331 T |
| 3,907,405 | 9/1975 | Fukai et al. | 340/713 |
| 4,045,791 | 8/1977 | Fukai et al. | 340/713 |
| 4,128,311 | 12/1978 | Smith et al. | 350/331 T |

*Primary Examiner*—Marshall M. Curtis
*Attorney, Agent, or Firm*—Thomas A. Briody; Robert T. Mayer; Paul R. Miller

[57] ABSTRACT

A display apparatus having a liquid crystal display is provided with a measuring element for controlling the drive voltages depending on the temperature of the liquid crystal. The effect of manufacturing tolerances and ageing phenomena are compensated for by means of an auxiliary measuring element. The electric voltages across the measuring element and the auxiliary measuring element differ from one another, for the adjustment of mutually different operating points on the capacitance-voltage curve.

7 Claims, 5 Drawing Figures

LIQUID CRYSTAL DISPLAY DEVICE HAVING CAPACITANCE COMPENSATION

The invention relates to a display device comprising a display screen having a plurality of display elements and a measuring element, the display screen comprising a liquid crystal enclosed between a first and a second cover plate each having a plurality of excitation electrodes for feeding electric display drive voltages to the display elements and an electric measuring drive voltage to the measuring element;

an excitation circuit for generating the display drive voltages and the measuring drive voltage; and a control circuit having at least a measuring input for an electric measuring signal, this measuring input being coupled to one of the excitation electrodes of the measuring element, and having at least a control output for an electric control signal;

which control circuit adjusts the amplitude of the display drive voltages and of the measuring drive voltage to the values corresponding to the threshold voltage of the liquid crystal in response to impedance variations of the measuring element resulting from the temperature and voltage dependence of the liquid crystal.

Such display devices are frequently used for displaying alpha-numerical information in data processing systems, measuring instruments etc. The symbols to be displayed can be displayed either in the form of a dot matrix or, alternatively, by means of a 7-segment pattern. In both cases excitation will usually be effected by means of a matrix control circuit, the individual display elements being operated in time-division multiplex.

With such a control the so-called multiplex factor will remain very low, usually limited to 2 or 3, if no special measures are taken, as the attainable multiplex factor depends on the difference between the voltages $V_{ON}$ and $V_{OFF}$ which are required, as apparent from the contrast-voltage curve, to achieve a sufficiently high contrast.

A high multiplex factor would be attainable with a sufficiently steep contrast-voltage curve but for the fact that the threshold voltage is always highly temperature-dependent. In the required temperature range the difference between the highest $V_{ON}$ occurring in this temperature range and the lowest $V_{OFF}$ are decisive for the attainable multiplex factor. In a display device of the type defined above this drawback is obviated to a considerable extent by adapting the amplitude of the excitation signals to the instantaneous values of $V_{ON}$ and $V_{OFF}$.

Also when the display device is not operated in time-division multiplex, temperature variations can be very disturbing if, for example, only very low supply voltages are available, as is inter alia the case for wrist watches, or if a very wide temperature range is required, as is inter alia the case for display devices in motor cars. A display device of the type defined in the preamble is known from "A novel method of temperature compensation for multiplexed liquid crystal displays", Electronic Letters, July 6, 1978, volume 14, No. 14, pages 430 and 431, FIG. 3 in particular.

This publication describes a display device in which a measuring element $G_{LC}$ is included in the display screen, the measuring element being arranged in series with an impedance Z in the control circuit. The a.c. voltage across the measuring element is used as the control voltage for adapting the amplitude of the excitation signals. This is possible because the capacitance-voltage curve of an element of the liquid crystal varies analogously with the contrast-voltage curve and shifts in the same manner along the direction of the voltage axis in response to temperature variations.

Although a proper temperature compensation can be achieved initially, it appears that in this system each display screen requires an individual adjustment. The capacitance of the measuring element $C_{LC}$ depends inter alia on manufacturing tolerances in the specifications of the liquid crystal and in the mechanical implementation of the display screen, particularly the average distance between the first and the second cover plate playing an important role.

In addition it appeared that the capacitance value at a certain temperature and voltage also varies due to ageing, so that the adjustment during the life of the display apparatus must be frequently corrected.

It is an object of the invention to provide a display apparatus wherein no adjustment is required to compensate for any differences between devices of one and the same type or variations in time.

According to the invention a display device of the type mentioned in the preamble is therefore characterized in that the display screen also comprises an auxiliary measuring element, the size of which differs from that of the measuring element, the auxiliary measuring element being arranged in series with the measuring element, with ends of this series arrangement being coupled to the excitation circuit for supplying the measuring drive voltage, and the junction of the measuring element and the auxiliary measuring element being coupled to the measuring input of the control circuit.

In a display device in accordance with the invention the ratio of the capacitances of measuring element and auxiliary measuring element are therefore not affected in the first order by tolerances in the properties of the liquid crystal or in the mechanical implementation of the display screen, as the percentages of the influences thereof are the same for both capacitors so that these tolerances do not affect the ratio of the electric voltage at the junction of the measuring element and the auxiliary measuring element and the measuring drive voltage. This also holds for deviations which may be caused by ageing of the display screen, for example, because the distance between the first and the second cover plate changes gradually.

As the measuring element and the auxiliary measuring element differ in size the electric voltages across these elements become unequal in the series arrangement. They are both capacitors having a portion of the liquid crystal as the dielectric, so that the capacitance as well as the parallel resistance of these capacitors are highly temperature-dependent, the predominant part being played by the capacitance, also because excitation is preferably effected by means of a.c. voltages in view of the required life time of the liquid crystal.

The relevant temperatures being the same, the measuring element and auxiliary measuring element are adjusted to different operating points of the capacitance-voltage curve owing to the mutually different voltages across the elements. The result thereof is that at a constant measuring drive voltage the capacitance values will change to a different extent in response to a change in the temperature, so that the ratio between the voltage at the junction and the measuring drive voltage changes.

By varying the measuring drive voltage the original ratio can thereafter be obtained again. This control is effected by using the voltage at the junction for a negative feedback control system in a manner which is known per se.

In this manner, with a sufficiently high loop gain in the control circuit, the influence of temperature variations on the setting of the liquid crystal can be made negligibly small over a wide temperature range.

An advantageous display device in accordance with the invention is furthermore characterized in that the control circuit comprises a differential amplifier, a first and a second signal input which constitute a first and a second measuring input of the control circuit; and a further series arrangement of a first and a second bridge impedance, ends of this further series arrangement being connected to the ends of the series arrangement of the measuring element and the auxiliary measuring element for forming a bridge circuit, wherein the junction of the measuring element and the auxiliary measuring element is coupled to the first measuring input and the junction of the first and the second bridge impedance is coupled to the second measuring input.

This control amplifier now compares the voltage at the junction of the measuring element and the auxiliary measuring element with the voltage at the junction of the two bridge impedances. So this latter voltage functions as the reference voltage. The ratio of this reference voltage to the measuring drive voltage can be chosen equal, using impedances of a sufficient precision for all devices of a production series, due to the fact that manufacturing tolerances cannot play an important role in the ratio of the capacitance values of the measuring element and the auxiliary measuring element.

Resistors can be used for the impedances, alternatively, for example, in the form of a fixed-tap resistor, co-integrated in an integrated circuit.

A further advantageous display device in accordance with the invention is characterized in that the control circuit comprises a differential amplifier, a first and a second signal input which constitute a first and a second measuring input of the control circuit; and the excitation circuit comprises a series arrangement of a first and a second electric voltage source for producing the measuring drive voltage;

wherein the junction of the measuring element and the auxiliary measuring element is coupled to the first measuring input and the junction of the first and the second voltage source is coupled to the second measuring input.

Herein the junction of the two voltage sources serve as the reference point for the control circuit. In all other respects the operation of this device is equivalent to the operation of the display device previously described.

Generally, the electrodes of the measuring element and the auxiliary measuring element together with the required electric connections as well as the electrodes of the display elements will be provided in the form of printed circuits onto the first and the second cover plates. It is then possible that, owing to tolerance errors in the preparation of drawings, photographs, printing masks etc. for production processes the ratio of the capacitance values does not fully correspond to the ratio of the two fixed reference elements, which last ratio can be known very accurately when precision components are used. To render the influence of this further tolerance problem negligibly small a further advantageous display device in accordance with the invention is characterized in that the measuring element and the auxiliary measuring element are formed from a number of equal and identical basic elements.

Only one of the basic elements need be drawn in the preparation stage whereas the other elements can be obtained by means of a repeating mechanism which is known per se. Should any drawing tolerances occur, they will now be exactly the same for all basic elements and therefore do not play any part in the adjustment of the bridge circuit.

In this last-mentioned case the two capacitance values will always be related as single integral numbers. This is no essential restriction as the ratio can be freely chosen between wide limits. If, for example, a ratio 1,5 is chosen, the smallest of the two measuring elements may, for example, consist of a parallel arrangement of 4 basic elements and the largest element of a parallel arrangement of 6 basic elements.

For large display screens, such as inter alia elongate display screens for measuring instruments, the thickness of the liquid crystal layer may vary somewhat owing to assembly tolerances, which might again affect the capacitance ratio. To obviate this, a further display device in accordance with the invention is characterized in that the basic elements are distributed evenly over the display screen.

Generally, the required excitation signals, the measuring excitation signal included, will be generated by means of electric circuits which are fed by one common supply unit. A very simple control feature is obtained when the excitation circuit is of a type wherein the amplitudes of the drive voltages, generated by the excitation circuit are predominantly proportional to a supply voltage applied to the excitation circuit, a supply input of the excitation circuit being connected to a supply output of a controllable supply unit having a control input for an electric control signal, this control input being coupled to the control output of the control circuit.

Adjusting the output voltage of the supply unit by means of an external control signal is done in a manner which is known per se, wherein, for example, the output signal of the differential amplifier is applied to the supply unit after having been rectified.

Embodiments of the invention will now be described by way of example, with reference to the drawings.

Figure 1:
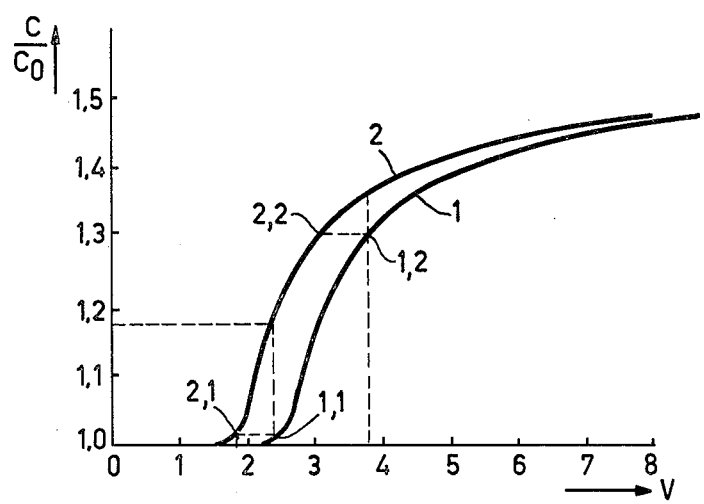
FIG. 1 shows two capacitance-voltage curves of a liquid crystal element with temperature of the liquid crystal being used as a parameter.

FIG. 1 shows two capacitance-voltage curves 1 and 2 for a twisted nematic liquid crystal for two different temperatures $T_1$ and $T_2$, respectively, of the liquid crystal, in an adapted shape taken from Meyerhofer, Mol. Cryst. Liq. Cryst, 1976, volume 34 (Letters), pages 13-17. However, the invention is in no way limited to liquid crystals of this type as it also holds for other types that a change in the molecule orientation in response to the application of a sufficiently strong electric field produces a change in the dielectric constant of the liquid crystal and therefore, simultaneously therewith, a change in the capacitance values of the measuring elements as well as of the display elements. This also holds for liquid crystals which are not of the so-called "root-mean-square" type, for which the amplitude of the drive voltage must be taken for the voltage along the X-axis of the Figure instead of the r.m.s. value across the element.

The relative capacitance value C of an element with respect to the initial value $C_O$ occurring at very low voltages is plotted on the vertical axis.

This relative capacitance value does not change considerably until it has reached a threshold voltage $V_{th}$, that is to say at the same $V_{th}$ which indicates the instant in the contrast-voltage curve at which the change in the molecule orientation begins. The curve 1 shows the curve for a temperature $T_1$, the curve 2 the curve for a higher temperature $T_2$ having threshold values $V_{th1}$ and $V_{th2}$, respectively, of approximately 2.3 and 1.8 V, respectively, in this example. An element of the liquid crystal is driven for display purposes by a (rms) a.c. voltage V, whose value varies between a voltage $V_{OFF}$ and a voltage $V_{ON}$. Generally, a value approximately equal to or lower than $V_{th}$ is chosen for the voltage $V_{OFF}$, it being possible to use a value somewhat higher than $V_{th}$ without the occurrence of an annoying reduction in contrast. Hereinafter it is assumed, for simplicity, that $V_{OFF} = V_{th}$. The value $V_{ON} > V_{OFF}$ is determined by the desired attainable contrast. In FIG. 1 the point 1,1 indicates $V_{OFF}$ and 1,2 indicates $V_{ON}$. Generally, it is sufficient to choose the value for $V_{ON}$ in this manner for one distinct temperature $T_i$ and to assume furthermore that $V_{ON} = aV_{th}$ wherein the constant a corresponds to:

$$a = \frac{V_{ON,i}}{V_{th,i}}$$

If a voltage $V_{OFF}$ or lower is applied to the element, the molecules will be in the rest condition; however, depending on the optical auxiliary means of observation, such as crossed polarizers or non-crossed polarizers, illumination by means of transmitted or incident light and on the chosen type of liquid crystal this may mean that the relevant element display itself to the viewer, as a light segment or display dot against a dark background and may, consequently, visually give the impression of being in the "ON"-state. So the designations $V_{OFF}$ and $V_{ON}$ are coupled to the rest condition and the "operating" condition, respectively, of the molecules and need therefor not correspond to visual "OFF" and "ON", respectively, of a display element.

If the voltages across the two elements are in the ratio of, for example, 1:1.5 it can be seen from the graph that the capacitance of the measuring element will increase at the higher temperature at otherwise unchanged voltages from 1.02 $C_{M,O}$ to approximately 1.18 $C_{M,O}$, whereas the capacitance of the auxiliary element does not yet increase. $NC_{M,O}$ is the capacitance of the measuring element at very low voltages.

In reality however the voltage distribution across the two elements will change. The changed voltage distribution allows the voltage $V_m$ over the measuring element to be reduced to such an extent that the operating point of the measuring element with a capacitance $C_M$ becomes located at the point 2,1 of curve 2, that is to say at a voltage across the element of approximately 1.8 V instead of 2.3 V. The voltage across the auxiliary element is 1.5 times lower and consequently decreases from approximately 1.53 V to approximately 1.2 V, and the measuring drive voltage must therefore be reduced from 2.3 + 1.53 = 3.82 V to 1.8 + 1.2 = 3.0 V to reach this state.

Figure 2:
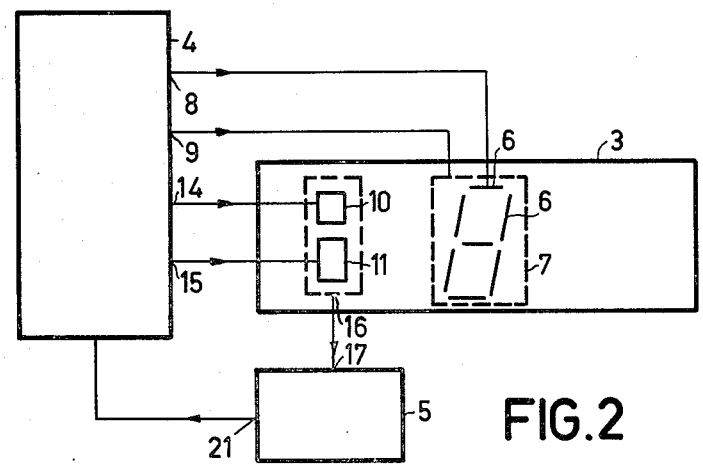
FIG. 2 shows a simplified block diagram of a display device in accordance with the invention.

FIG. 2 is a simplified block diagram of a display apparatus according to the invention having a display screen 3, an excitation circuit 4 and a control circuit 5.

A portion of a number of display elements 6 of the display screen is shown in the form of electrodes, shown by means of a solid line, on the first cover plate and a common counter electrode 7, shown by means of a dotted line, on the second cover plate. Shown are the connections for the top element 6 to the excitation circuit 4, the first electrode of this display element being connected to an output 8 of the excitation circuit 4. The second electrode or counter electrode 7 being connected to an output 9.

In a manner, which is known per se a drive voltage $V_{OFF}$ or $V_{ON}$ is generated between the outputs 8 and 9, depending on the information to be displayed.

In addition the display screen 3 comprises a measuring element 10 and an auxiliary measuring element 11 having a common counter electrode 16 which also constitutes the junction of measuring element 10 and auxiliary measuring element 11b The first electrodes of these two elements are connected to outputs 14 and 15, respectively, of the excitation circuit 4, it being possible to generate a measuring drive voltage $V_m$ between these outputs.

The junction 16 is coupled to a measuring input 17 of the control circuit, which generates a control voltage at a control output 21 for the simultaneous control of the output voltages $V_m$, $V_{OFF}$ and/or $V_{ON}$ of the excitation circuit 4.

Two embodiments of the coupling of measuring element 10 and auxiliary measuring element 11 to the input section of the control circuit 5 are discussed with reference to the FIGS. 3 and 4. Corresponding components in the Figures have been given the same reference numerals.

Figure 3:
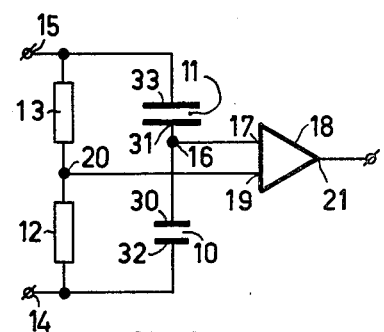
FIG. 3 shows a simplified circuit diagram of a bridge circuit having a first and a second bridge impedance.

FIG. 3 shows an example of a measuring element 10 having an initial capacitance value $C_{M,O}$, arranged in series with an auxiliary measuring element 11 having an initial capacitance value $C_{H,O}$ and included in a bridge circuit which further comprises two fixed impedances 12 and 13, for example resistors having resistance values $R_1$ and $R_2$, respectively. A measuring drive a.c. voltage $V_m$ is applied to the bridge circuit via the terminals 14 and 15.

The tap 16 of the series arrangement of measuring element 10 and auxiliary measuring element 11 is coupled to a first input 17 of a differential amplifier 18, which has a second input 19 coupled to a tap 20 of the series arrangement of the impedances 12, 13 and an output 21 which constitutes the output for a control voltage $$V_R = k(V_{20} - V_{off})$$

where k is a constant and $V_{20}$ the voltage across the impedance 12 and V the voltage across the auxiliary element 10.

The bridge circuit is in balance when $$C_M/C_H = R_2/R_1$$

A simple system is obtained when $R_1$ and $R_2$ are chosen so that $$R_2/R_1 = C_{M,O}/C_{H,O}$$

in the example shown in the drawing $C_{H,O} > C_{M,O}$ but this is not essential. When $C_{H,O} < C_{M,O}$ the circuit operates in a similar manner, the difference being that the bridge output a.c. voltage will have the opposite polarity when the bridge balance is disturbed in response to a capacitance change.

It is clear that $$V_{off} = \frac{C_H}{C_M + C_H} \cdot V_m$$

As long as $V_{off} < V_{th}$ the capacitors have a capacitance $C_{M,O}$ and $C_{H,O}$, respectively, so that the bridge circuit is in balance and $V_R = 0$.

When $V_m$ increases to such a value that $V_{off}$ just exceeds $V_{th}$ then the capacitance of the measuring element 10 will increase in accordance with FIG. 1 so that $C_M > C_{M,O}$. The voltage across the auxiliary measuring element 11 is equal to $$V_H = \frac{C_M}{C_M + C_H} V_M = \frac{C_M}{C_H} V_{OFF}$$

and, consequently, $V_H$ is still lower than $V_{th}$, so that $C_H = C_{H,O}$. The bridge is now out of balance and produces, after amplification, a control voltage $V_R \neq 0$, which vigorously opposes in known manner a further increase of $V_m$ in a negative feedback control system. This stabilizes the voltage $V_{off}$ at a value which is always approximately equal to $V_{th}$ and consequently generally also approximately equal or equal to $V_{OFF}$. At a temperature $T_1$ this results in a setting at which the operating point of the measuring element corresponds to the point 1,1 of curve 1 in FIG. 1.

Should the temperature increase to a value $T_2$ the bridge circuit becomes again unbalanced. The increase of the bridge output a.c. voltage now causes the excessive value of $V_m$ to decrease until the setting of the measuring element substantially corresponds to the point 2,1 of the curve 2 in FIG. 1, the ratio of the capacitance values being equal to that set at the temperature $T_1$. Now the voltage across the measuring element is substantially equal to the new threshold voltage $V_{th}$ which is associated with the curve 2.

By controlling the drive voltages $V_{ON}$ and $V_{OFF}$ in a similar manner as $V_m$, $V_{OFF}$ will also substantially correspond at this new temperature to the point 2,1 of curve 2, whereas $V_{ON}$ approximately corresponds to the point 2,2 of this curve.

Consequently the contrast occurring at the display elements is in a first approximation independent of the temperature.

So in this example the setting of $V_m$ must satisfy $$V_m = \frac{C_M + C_H}{C_H} V_{off} - \frac{C_M + C_H}{C_H} V_{th},$$

whereas $V_{ON} = a\, V_{th}$.

If $V_{ON}$, $V_{OFF}$ and $V_m$ are all generated by means of the same controlled system, they are, for example, all in a fixed ratio to the supply voltage of a controlled power supply, one control voltage for all drive voltages will be sufficient. Generally, this is, for example, the case when the signals are generated by means of digital circuits.

When $C_M$ and $C_H$ are suitably chosen it is possible to achieve an adjusted value $V_m$ that is also suitable for an other drive voltage in the display device. Even when the elements 10 and 11 are implemented from a plurality of parallel-arranged basic elements it is always possible to obtain a sufficiently proper approximation.

The invention idea does not require the bridge to be in balance at a voltage $V_{OFF} = V_{th}$.

Alternatively, $C_{H,O}$, $C_{M,O}$, $R_1$ and $R_2$ can be chosen so that the bridge is in balance for $V_{OFF} = V_A$, where, for example, $V_H > V^{th}$.

The bridge circuit will now be out of balance for all values of $V_m$, so that $V_{OFF} < V_A$, but the polarity of the bridge output voltage will be the opposite of voltages for which $V_{OFF} > V_A$. If, for example, $V_R$ is rectified in a phase-dependent manner which is known per se, for example by means of a synchronous detection relative to $V_m$, then the rectified control voltage will, for example, pass from a negative value through zero to a positive value at an increasing $V_m$, as soon as $V_{OFF}$ exceeds $V_A$.

It is alternatively possible to choose the bridge circuit so that it is in balance at a much higher $V_m$, for example thus that $V_{OFF}$ stabilizes at a value approximately equal to $V_{ON}$, it only being a condition that the operating point of the control circuit is chosen to be in a position where the capacitance-voltage curve has a sufficiently pronounced curve, so not at or near the point of inflection of the curve.

An operating point at an area of the curve which is curved to a lesser extent than the area at and around $V_{th}$ indeed requires a higher gain of the differential amplifier 18 and the terminals 17 and 19 of the amplifier 18 must possibly be interchanged or the polarity of the synchronous detection must, for example, be reversed for curves for which the second derivative gets the other sign.

The actual performance of such variations in the embodiment of a display device in accordance with the invention are fully within the capability of those skilled in the art.

It will be clear that neither the measuring element nor the auxiliary measuring element can serve as a display element which, depending on the information applied to the excitation circuit, must sometimes be visually ON, sometimes visually OFF. Depending on the chosen embodiment they are both either visually ON for the time the display device is in the switched-ON stage, or they are both constantly visually OFF.

In the first case the elements can be visually covered, for example by means of a frame around the display screen, or either one of the two elements or both can be used for the display of a figure which must be visually constantly ON, for example a frame or "box", a type indication or the emblem of a firm.

The second case does not require special measures. Particularly for large display screens it is then advantageous that the measuring element and auxiliary measuring element can be included in any arbitrary location between the picture display elements.

Generally it will be efficient to provide the interconnected electrodes 30, 31 on one and the same cover plate and the electrodes 32, 33 of the auxiliary elements on the other cover plate. However, this is not a requirement.

Figure 4:
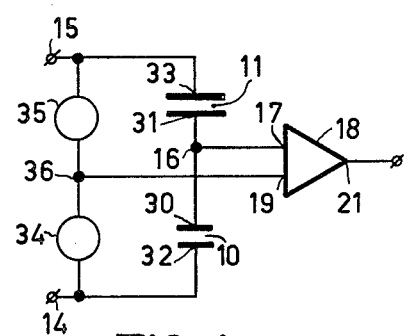
FIG. 4 shows a simplified circuit diagram of a bridge circuit having a first and a second voltage source, arranged in series therewith, for supplying the measuring drive voltage.

FIG. 4 shows an embodiment wherein the measuring drive signal $V_m$ is produced by a series arrangement of two voltage sources 34 and 35. When the ratios of the voltages $V_1$ and $V_2$ of these voltage sources are equal to the ratios of the impedances $R_1$ and $R_2$, respectively, of FIG. 3, the voltage at the junction 36 of the two voltage sources will be the same as that at the junction 16 of FIG. 2. In all other respects the circuit shown in FIG. 4 operates in the same manner as that shown in FIG. 3.

The bridge circuit will be in balance when, for example:

$$R_2/R_1 = C_M/C_H$$

For a predetermined chosen setting then $$C_M = a\, C_{M,O}$$

and $$C_h = b\, C_{H,O}.$$

If the setting has been chosen as shown in FIG. 1 then it follows, for example, that
a=1.02
b=1.00
So, generally $$\frac{R_2}{R_1} = K \frac{C_{M,O}}{C_{H,O}}$$

for a chosen constant K=a/b.

As mentioned above the ratio of $C_{M,O}$ and $C_{H,O}$ are only determined by the ratios of the surface areas of measuring element 10 and auxiliary measuring element 11 and independent of manufacturing tolerances and ageing of the display scree. Once these surface areas have been drawn with a sufficient accuracy in the pre-production stage the ratios of $R_2$ and $R_1$ are therefore known, so that fixed resistors, generally having fixed impedances, are sufficient. It is then not necessary, to adjust each produced item individually nor to repeatedly adjust in the case of ageing.

The ratio $C_{M,O}/C_{H,O}$ can be chosen freely within wide limits. In the given example it is clear that the voltage across $C_h$ is little important, as long as this voltage is sufficiently low with respect to $V_{th}$.

It will therefore always be possible to choose the surface areas of the measuring element so that the mutual ratio consists of single integral numbers. In that case the measuring elements can be formed by means of mutually equal basic elements having a surface area e.

When choosing the ratio to be 2, then one element can be formed by one basic element and the other one by means of two parallel-arranged basic elements, but, alternatively also by, for example, two parallel-arranged and four parallel-arranged basic elements, respectively.

A factor of 1.5, as mentioned above by way of example results in $$\frac{C_{M,O}}{C_{H,O}} = \frac{2e}{3e} \text{ or } \frac{4e}{6e} \text{ etc.}$$

This now offers the possibility of eliminating a drawing tolerance in the pre-production stage as well. As the cover plates are implemented as printed circuits, a non-recurrent drawing of a basic element and its reproduction by means of a repetition device which is known per se, which is much more accurate than a renewed drawing by a draughtsman, will be sufficient.

Figure 5:
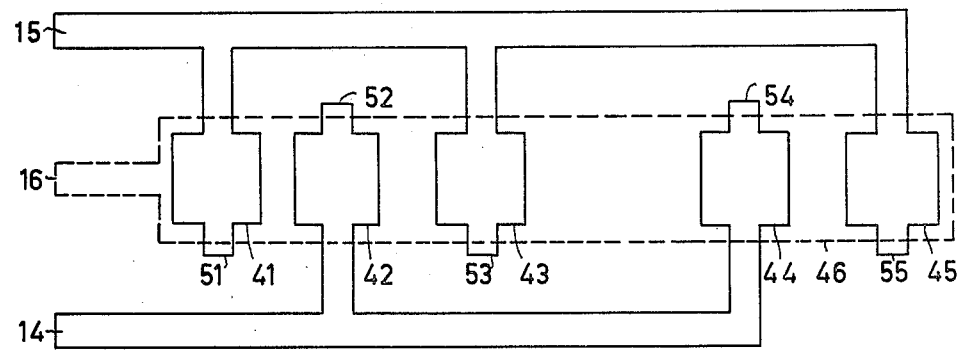
FIG. 5 is an example of an advantageous electrode configuration for the measuring element and the auxiliary measuring element.

FIG. 5 shows a configuration of five basic elements, arranged in parallel in groups of two and three basic elements, respectively, the basic elements 41, 43 and 45 having been arranged in parallel at one side by means of the conductor 15, and the basic elements 42, 44 by means of the conductor 14. A common counter electrode on the other cover plate is shown in outline by means of the dotted line 46 and is connected to the conductor 16. So, as in FIG. 2, the additional auxiliary element 11, implemented with the basic elements 41, 43 and 45, is larger than the measuring element 10, in this example more particularly $$C_{H,O} = 1.5 C_{M,O}$$

In the chosen example associated herewith $$\frac{R_2}{R_1} = 1.02 \frac{C_{M,O}}{C_{H,O}} = \frac{1.02}{1.5} = 0.68.$$

This value can be realized by means of a series arrangement of two precision resistors or with a co-integrated resistor in an integrated circuit having a tap at the $0.405^{th}$ portion of the length for which it holds that $$\frac{0.405}{1 - 0.405} = 0.68.$$

Also here it holds that the manufacturing tolerances have a negligible influence on this ratio, although the absolute values of $R_1$ and $R_2$ will not be equal for all the produced items.

The electrodes indicated by means of a solid line can be provided with dummy projections 51 to 55, inclusive, located opposite the connecting conductors. These projections ensure that a slight relative shift between the first and the second cover plate occurring during assembly of the display screen does not affect the capacitance of the basic element so that also this manufacturing tolerance does not influence the control accuracy. The effect of a slight horizontal shift is also negligible owing to a sufficient overlapping by the counter electrode 46.

It is obvious that the element need not be exactly aligned, as shown in FIG. 5, but that they may be distributed in an apparently random manner over the display screen, thus that both $C_H$ and $C_M$ furnish the best possible approximation of the chosen values if the thickness of the display screen would vary somewhat into the horizontal and/or the vertical direction.

Finally, it should be noted that a high multiplex factor can also be achieved by means of the known two frequency control, which, however, usually requires high drive voltage. Such a display apparatus can also be fruitfully implemented in accordance with the invention, so that either lower voltages will be sufficient, or a still higher multiplex factor can be realised at the same voltages.

What is claimed is:

1. A display device comprising
   a display screen having a plurality of display elements and a measuring element, said display screen comprising a liquid crystal enclosed between a first and a second cover plate each having a plurality of excitation electrodes for applying electric display drive voltages to said display elements and for applying an electric measuring device voltage to said measuring element;
   an excitation circuit for generating said display drive voltages and said measuring drive voltage;
   a control circuit having at least a measuring input for an electric measuring signal, said measuring input being coupled to one of said excitation electrodes of said measuring element, and at least a control output for an electric control signal,
   said control circuit adjusting amplitudes of said display drive voltages and of said measuring drive voltage to a value corresponding to the threshold voltage of the liquid crystal in response to impedance variations of said measuring element resulting from temperature and voltage dependence of said liquid crystal,
   characterized in that said display screen also comprises an auxiliary measuring element which differs in size from said measuring element, said auxiliary measuring element being arranged in series with said measuring element, said series arrangement having ends coupled to said excitation circuit for supplying said measuring drive voltage, and the junction of the measuring element and the auxiliary measuring element being coupled to said measuring input of said control circuit.

2. A display device as claimed in claim 1, characterized in that said control circuit comprises
   a differential amplifier, a first and a second signal input which constitute a first and a second measuring input of said control circuit; and
   a further series arrangement of a first and a second bridge impedance, ends of said further series arrangement being connected to ends of said series arrangement of said measuring element and said auxiliary measuring element for forming a bridge circuit,
   wherein the junction of said measuring element and said auxiliary measuring element is coupled to the first measuring input and the junction of the first and the second bridge impedance is coupled to the second measuring input.

3. A display device as claimed in claim 2, characterized in that said first and second bridge impedances are resistors.

4. A display device as claimed in claim 1, characterized in that
   said control circuit comprises a differential amplifier, a first and a second signal input which constitute a first and a second measuring input of said control circuit; and
   said excitation circuit comprises a series arrangement of a first and a second electric voltage source for producing said measuring drive voltage;
   wherein said junction of said measuring element and said auxiliary measuring element is coupled to said first measuring input and the junction of said first and second voltage source is coupled to said second measuring input.

5. A display device as claimed in any one of the preceding claims, characterized in that said measuring element and said auxiliary measuring element are formed from a plurality of equal and identical basic elements.

6. A display device as claimed in claim 5, characterized in that said basic elements are evenly distributed over said display screen.

7. A display device as claimed in claim 1, characterized in that said excitation circuit is of a type wherein amplitudes of said drive voltages generated by said excitation circuit are predominantly proportional to a supply voltage applied to said excitation circuit, a supply input of said excitation circuit being connected to a supply output of a controllable power supply having a control input for an electric control signal, said control input being coupled to said control output of said control circuit.

* * * * *